United States Patent
Ngan et al.

(10) Patent No.: US 11,341,101 B2
(45) Date of Patent: *May 24, 2022

(54) DATA SYNCHRONIZATION

(71) Applicant: NetApp Inc., Sunnyvale, CA (US)

(72) Inventors: Ching-Yuk Paul Ngan, Redwood City, CA (US); Kanwaldeep Singh, Sunnyvale, CA (US); Yuedong Mu, San Jose, CA (US); Manoj Kumar V Sundararajan, Sunnyvale, CA (US)

(73) Assignee: NetApp Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,671

(22) Filed: May 7, 2020

(65) Prior Publication Data

US 2020/0265018 A1  Aug. 20, 2020

Related U.S. Application Data

(63) Continuation of application No. 14/865,442, filed on Sep. 25, 2015, now Pat. No. 10,684,994.

(51) Int. Cl.
*G06F 16/00* (2019.01)
*G06F 16/178* (2019.01)
(Continued)

(52) U.S. Cl.
CPC ........ *G06F 16/178* (2019.01); *G06F 11/1471* (2013.01); *G06F 11/2076* (2013.01); *G06F 11/2082* (2013.01); *G06F 2201/855* (2013.01)

(58) Field of Classification Search
CPC ...... G06F 16/178; G06F 16/27; G06F 16/128; G06F 16/184; G06F 16/273;
(Continued)

(56) References Cited

U.S. PATENT DOCUMENTS 5,043,866 A * 8/1991 Myre, Jr. ............ G06F 11/1471
5,440,727 A * 8/1995 Bhide .................. G06F 16/273
711/117
(Continued)

OTHER PUBLICATIONS

"Data Replication Strategies for Fault Tolerance and Availability on Commodity Clusters", 2000, Cristiana Amza, Alan L. Cox and Willy Zwaenepoci, IEEE Computer Soc., Dependable Systems and Networks Proceedings International Conference on New York, N.Y., pp. 459-467.

(Continued)

*Primary Examiner* — Ashish Thomas
*Assistant Examiner* — Rezwanul Mahmood
(74) *Attorney, Agent, or Firm* — Cooper Legal Group, LLC

(57) ABSTRACT

One or more techniques and/or computing devices are provided for data synchronization. For example, an in-flight log may be maintained to track storage operations that are received by a first storage node, but have not been committed to both first storage of the first storage node and second storage of a second storage node that has a replication relationship, such as a disaster recovery relationship, with the first storage node. A dirty region log may be maintained to track regions within the first storage that have been modified by storage operations that have not been replicated to the second storage. Accordingly, a catchup synchronization phase (e.g., asynchronous replication by a resync scanner) may be performed to replicate storage operations (e.g., replicate data within dirty regions of the first storage that were modified by such storage operations) to the second storage until the first storage and the second storage are synchronized.

20 Claims, 14 Drawing Sheets

(51) Int. Cl.
*G06F 11/14* (2006.01)
*G06F 11/20* (2006.01)

(58) Field of Classification Search
CPC ............... G06F 16/275; G06F 16/1865; G06F 16/2358; G06F 16/2365
USPC ........................................................ 707/611
See application file for complete search history.

(56) References Cited

U.S. PATENT DOCUMENTS

| | | | | |
|---|---|---|---|---|
| 5,465,328 A * | 11/1995 | Dievendorff | ........ | G06F 11/1471 707/999.202 |
| 5,530,855 A * | 6/1996 | Satoh | ................. | G06F 11/2064 707/648 |
| 5,561,795 A * | 10/1996 | Sarkar | ................. | G06F 11/1471 |
| 6,654,912 B1 * | 11/2003 | Viswanathan | ....... | G06F 11/2064 707/999.202 |
| 7,031,986 B2 * | 4/2006 | Ito | ........................ | G06F 11/2069 707/649 |
| 7,039,661 B1 * | 5/2006 | Ranade | ................. | G06F 16/184 707/610 |
| 7,082,446 B1 * | 7/2006 | Bottomley | ............ | G06F 16/273 707/610 |
| 7,328,319 B1 * | 2/2008 | Bottomley | .......... | G06F 11/2082 707/999.202 |
| 7,373,438 B1 * | 5/2008 | DeBergalis | ........... | G06F 3/0611 707/999.001 |
| 7,389,379 B1 * | 6/2008 | Goel | .................... | G06F 11/1662 711/112 |
| 7,389,396 B1 * | 6/2008 | Goel | .................... | G06F 11/0727 711/112 |
| 7,395,378 B1 * | 7/2008 | Pendharkar | ......... | G06F 11/2082 711/100 |
| 7,415,488 B1 * | 8/2008 | Muth | ................... | G06F 11/2082 707/648 |
| 7,490,103 B2 * | 2/2009 | Stager | ................. | G06F 11/1469 |
| 7,617,259 B1 * | 11/2009 | Muth | ................... | G06F 11/2064 |
| 7,636,801 B1 * | 12/2009 | Kekre | ................. | H04L 67/1097 709/218 |
| 7,809,868 B1 * | 10/2010 | Mu | ........................ | G06F 3/0604 710/74 |
| 7,885,923 B1 * | 2/2011 | Tawri | ................... | G06F 11/2074 707/610 |
| 8,099,627 B1 * | 1/2012 | Shah | ................... | G06F 11/1438 714/16 |
| 8,150,805 B1 * | 4/2012 | Tawri | ................... | H04L 67/1095 707/629 |
| 8,296,759 B1 * | 10/2012 | Hutchins | ............. | G06F 9/45558 718/1 |
| 8,359,429 B1 * | 1/2013 | Sharma | ............... | G06F 11/2064 711/111 |
| 8,401,997 B1 * | 3/2013 | Tawri | ................... | G06F 11/2064 707/655 |
| 8,533,410 B1 * | 9/2013 | Corbett | ............... | G06F 11/1435 711/162 |
| 8,832,035 B2 * | 9/2014 | Raj | ......................... | G06F 3/065 707/664 |
| 8,924,656 B1 * | 12/2014 | Usgaonkar | ............ | G06F 3/0614 711/152 |
| 9,031,913 B1 * | 5/2015 | Natanzon | ................. | G06F 3/067 707/648 |
| 9,235,632 B1 * | 1/2016 | Natanzon | ................. | G06F 3/061 |
| 9,268,652 B1 * | 2/2016 | Salyers | ................. | G06F 3/0685 |
| 9,460,177 B1 * | 10/2016 | Pawar | ................. | G06F 16/1865 |
| 9,495,370 B1 * | 11/2016 | Chatterjee | ........ | G06F 16/128 |
| 9,645,892 B1 * | 5/2017 | Patwardhan | ........ | G06F 11/1464 |
| 9,720,619 B1 * | 8/2017 | Shah | ................... | H04L 67/1097 |
| 9,720,752 B2 * | 8/2017 | Mu | ........................ | G06F 11/2097 |
| 9,727,262 B2 * | 8/2017 | Kaushik | ............ | G06F 3/0683 |
| 10,019,502 B2 * | 7/2018 | Shetty | ................. | G06F 3/067 |
| 10,142,416 B2 * | 11/2018 | Morefield | ............ | G06F 3/0647 |
| 10,353,870 B2 * | 7/2019 | Shetty | ................. | G06F 16/178 |
| 10,437,521 B2 * | 10/2019 | Joseph | .................... | G06F 3/067 |
| 10,482,066 B2 * | 11/2019 | Shah | ................... | G06F 3/067 |
| 10,621,058 B2 * | 4/2020 | Patnaik | ............... | G06F 11/2094 |
| 10,684,994 B2 * | 6/2020 | Ngan | ................... | G06F 16/178 |
| 10,852,985 B2 * | 12/2020 | Narasingarayanapeta | .................. | G06F 3/0611 |
| 10,983,951 B1 * | 4/2021 | Kuang | ................. | G06F 16/2365 |
| 11,086,551 B2 * | 8/2021 | Narasingarayanapeta | .................. | G06F 3/065 |
| 11,120,048 B2 * | 9/2021 | Kaushik | ............. | G06F 16/2358 |
| 11,151,162 B2 * | 10/2021 | Narasingarayanapeta | .................. | G06F 16/275 |
| 11,157,455 B2 * | 10/2021 | Narasingarayanapeta | .................. | G06F 16/176 |
| 2004/0010499 A1 * | 1/2004 | Ghosh | ................. | G06F 16/2358 |
| 2004/0078370 A1 * | 4/2004 | Acree | ..................... | G06F 16/27 |
| 2004/0139128 A1 * | 7/2004 | Becker | ............ | G06F 11/1456 |
| 2004/0260900 A1 * | 12/2004 | Burton | ................. | G06F 3/0647 711/162 |
| 2005/0193244 A1 * | 9/2005 | Stager | ................. | G06F 11/2082 714/12 |
| 2006/0112251 A1 * | 5/2006 | Karr | ........................ | G06F 3/067 711/170 |
| 2006/0195493 A1 * | 8/2006 | Chang | ................. | G06F 11/1466 |
| 2007/0022264 A1 * | 1/2007 | Bromling | ............ | H04L 67/1097 711/162 |
| 2007/0050349 A1 * | 3/2007 | Schreter | ..................... | G06F 8/41 |
| 2008/0005192 A1 * | 1/2008 | Jung | ................... | G06F 11/1441 |
| 2008/0010515 A1 * | 1/2008 | Robinson | ............ | G06F 11/2082 714/15 |
| 2008/0147756 A1 * | 6/2008 | Stager | ................. | G06F 11/2082 |
| 2009/0240739 A1 * | 9/2009 | Bhatt | ...................... | G06F 9/526 |
| 2009/0254582 A1 * | 10/2009 | Karamanolis | ......... | G06F 3/0689 |
| 2009/0254584 A1 | 10/2009 | Leff et al. | | |
| 2010/0211554 A1 * | 8/2010 | Reid | ............... | G06F 16/2358 707/703 |
| 2010/0228913 A1 * | 9/2010 | Czezatke | ............ | G06F 3/0653 711/112 |
| 2010/0318700 A1 * | 12/2010 | Rangan | ................... | G06F 3/067 710/74 |
| 2011/0107025 A1 * | 5/2011 | Urkude | ............... | G06F 11/2097 711/112 |
| 2012/0226668 A1 * | 9/2012 | Dhamankar | ........ | G06F 11/1471 707/690 |
| 2013/0067179 A1 * | 3/2013 | Paleologu | ........... | G06F 11/1076 711/159 |
| 2014/0095758 A1 * | 4/2014 | Smith | ................... | G06F 3/0685 710/308 |
| 2014/0201139 A1 * | 7/2014 | Blanding | ................ | G06F 16/27 707/621 |
| 2014/0258241 A1 * | 9/2014 | Chen | ................. | G06F 16/2358 707/683 |
| 2014/0279941 A1 * | 9/2014 | Atkisson | ............ | G06F 16/2365 707/690 |
| 2015/0261620 A1 * | 9/2015 | Ruiz | .................... | G06F 11/1451 707/649 |
| 2016/0092464 A1 * | 3/2016 | Hildebrand | ......... | G06F 16/1805 707/648 |
| 2016/0092468 A1 * | 3/2016 | Hildebrand | ............ | G06Q 10/00 707/633 |
| 2016/0110378 A1 * | 4/2016 | Mu | ....................... | G06F 11/006 707/634 |
| 2016/0127462 A1 * | 5/2016 | Mu | ..................... | H04L 67/1097 709/219 |
| 2016/0253197 A1 * | 9/2016 | Bonzini | .............. | G06F 9/45558 718/1 |
| 2016/0344834 A1 * | 11/2016 | Das | ................. | G06F 11/3476 |
| 2016/0378818 A1 * | 12/2016 | Marcotte | ............ | G06F 16/183 707/703 |
| 2017/0060702 A1 * | 3/2017 | Dave | ................. | G06F 11/1441 |
| 2017/0091215 A1 * | 3/2017 | Beard | ................. | G06F 16/184 |
| 2017/0091299 A1 * | 3/2017 | Ngan | ................. | G06F 11/2076 |
| 2017/0154093 A1 * | 6/2017 | Shetty | ................. | G06F 3/0617 |
| 2017/0185323 A1 * | 6/2017 | Kaushik | ............ | G06F 11/1471 |
| 2017/0235805 A1 * | 8/2017 | Shetty | ................. | G06F 16/178 707/634 |
| 2017/0277739 A1 * | 9/2017 | Joseph | ................... | G06F 3/0643 |

(56) References Cited

U.S. PATENT DOCUMENTS

| | | | |
|---|---|---|---|
| 2017/0315874 A1* | 11/2017 | Patnaik | G06F 11/2094 |
| 2017/0316029 A1* | 11/2017 | Shah | G06F 3/067 |
| 2017/0322837 A1* | 11/2017 | Mu | G06F 11/00 |
| 2018/0144015 A1* | 5/2018 | Mittur Venkataramanappa | G06F 11/1471 |
| 2020/0050687 A1* | 2/2020 | Kaushik | G06F 11/2097 |
| 2020/0285655 A1* | 9/2020 | Kaushik | G06F 16/275 |
| 2020/0301948 A1* | 9/2020 | Narasingarayanapeta | G06F 16/275 |
| 2020/0372046 A1* | 11/2020 | Vijayan | G06F 16/184 |
| 2021/0406280 A1* | 12/2021 | Kaushik | G06F 16/275 |

OTHER PUBLICATIONS

International Search Report and Written Opinion for Application No. PCT/US2016/052431 dated Dec. 9, 2016, 14 pages.

\* cited by examiner

DATA SYNCHRONIZATION

RELATED APPLICATIONS

This application claims priority to and is a continuation of U.S. application Ser. No. 14/865,442, filed on Sep. 25, 2015, now allowed, titled "DATA SYNCHRONIZATION," which is incorporated herein by reference.

BACKGROUND

Many storage networks may implement data replication for data loss protection. For example, a first storage cluster may comprise a first storage node configured to provide clients with primary access to data stored within a first storage device and/or other storage devices. A second storage cluster may comprise a second storage node configured to provide clients with access to data stored within a second storage device (e.g., failover access to replicated data within the second storage device) and/or other storage devices (e.g., primary access to data stored within a third storage device). The first storage node and the second storage node may be configured according to a disaster recovery relationship, such that the second storage node may provide failover access to replicated data that was replicated from the first storage device to the second storage device.

When the first storage node and the second storage node are in a synchronous replication state, storage operations (e.g., data change fileops, offload fileops, metadata change fileops, abort operations, etc.) are synchronously replicated from the first storage node and first storage device to the second storage node and the second storage device. For example, a write storage operation may be received from a client by the first storage node. Before a response is provided back to the client that the write storage operation is complete, the write storage operation is to be both written to the first storage device and replicated to the second storage device. If a replication error or other issue occurs (e.g., the second storage node has a failure or reboots, a network connection between the first storage node and the second storage node is lost, etc.), then the first storage node and the second storage node may transition into an out-of-sync state without strict data consistency between the first storage device and the second storage device.

DETAILED DESCRIPTION

Figure 1:
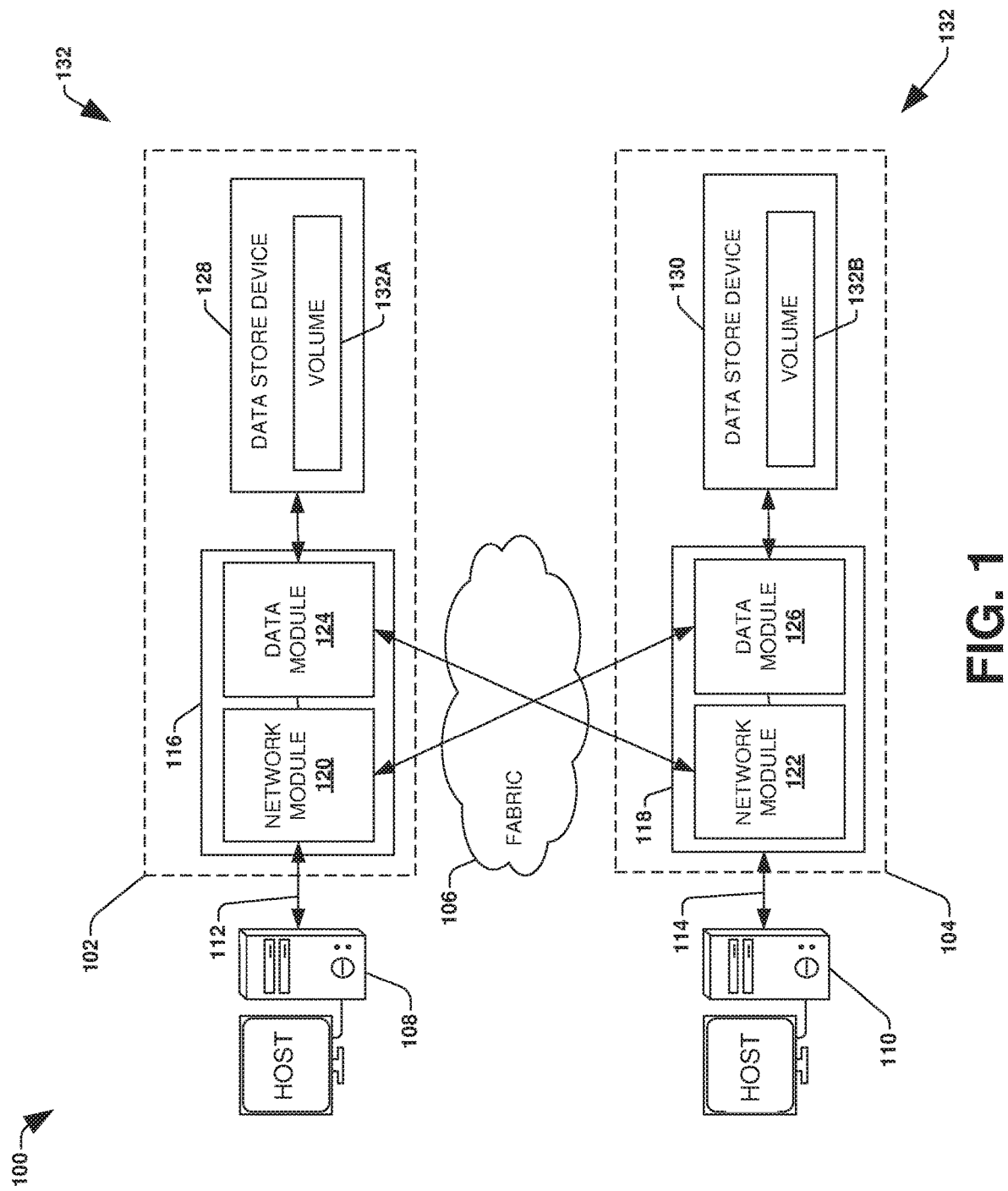
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for data synchronization are provided. For example, an in-flight log may be maintained to track storage operations that are received by a first storage node, but have not been committed to both first storage of the first storage node and second storage of a second storage node having a replication relationship, such as a disaster recovery relationship, with the first storage node. In an example, a storage operation may be implemented to write to the first storage by the first storage node simultaneously with the creation of an entry, within the in-flight log, for the storage operation (e.g., the first storage and the in-flight log may be change simultaneously through shared write access provided by a file system).

A dirty region log, such as a bitmap, may be used to track what regions of the first storage have been changed by storage operations that have not yet been replicated to the second storage. In this way, a catchup synchronization phase may be performed using the in-flight log and/or the dirty region log to replicate (e.g., asynchronous replication by a resync scanner) storage operations (e.g., dirty regions modified by storage operations) to the second storage and second storage node. A sync log, corresponding to the in-flight log and/or the dirty region log, may be efficiently maintained and used to reduce latency for responding to clients (e.g., a storage operation may be written to the first storage and a notification of the storage operation being complete may be sent to the client notwithstanding the storage operation not yet being replicated to the second storage because data of the storage operation will later be asynchronously replicated based upon the sync log), maintain low overhead (e.g., the sync log may comprise bitmaps that may be efficiently zeroed out), maintain consistency with snapshots (e.g., the sync log may be used to identify a snapshot difference between a snapshot of the first storage and of the second storage), provide persistent storage (e.g., the sync log may be stored on disk), etc.

To provide context for data synchronization, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a network file system (NFS) protocol a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that data synchronization may be implemented within the clustered network environment 100. In an example, storage operations, associated with data within the data storage device 128 of the node 116, may be replicated to the data storage device 130 of the node 118. For example, a catchup synchronization phase may use an in-flight log and/or a dirty region log (e.g., used to track storage operations received by the node 116 and/or regions within the data storage device 128 modified by storage operations but not yet replicated to the data storage device 130) to asynchronously replicate data to the data storage device 130. It may be appreciated that data replication may be implemented for and/or between any type of computing environment, and may be transferrable between physical devices (e.g., node 116, node 118, etc.) and/or a cloud computing environment (e.g., remote to the clustered network environment 100).

Figure 2:
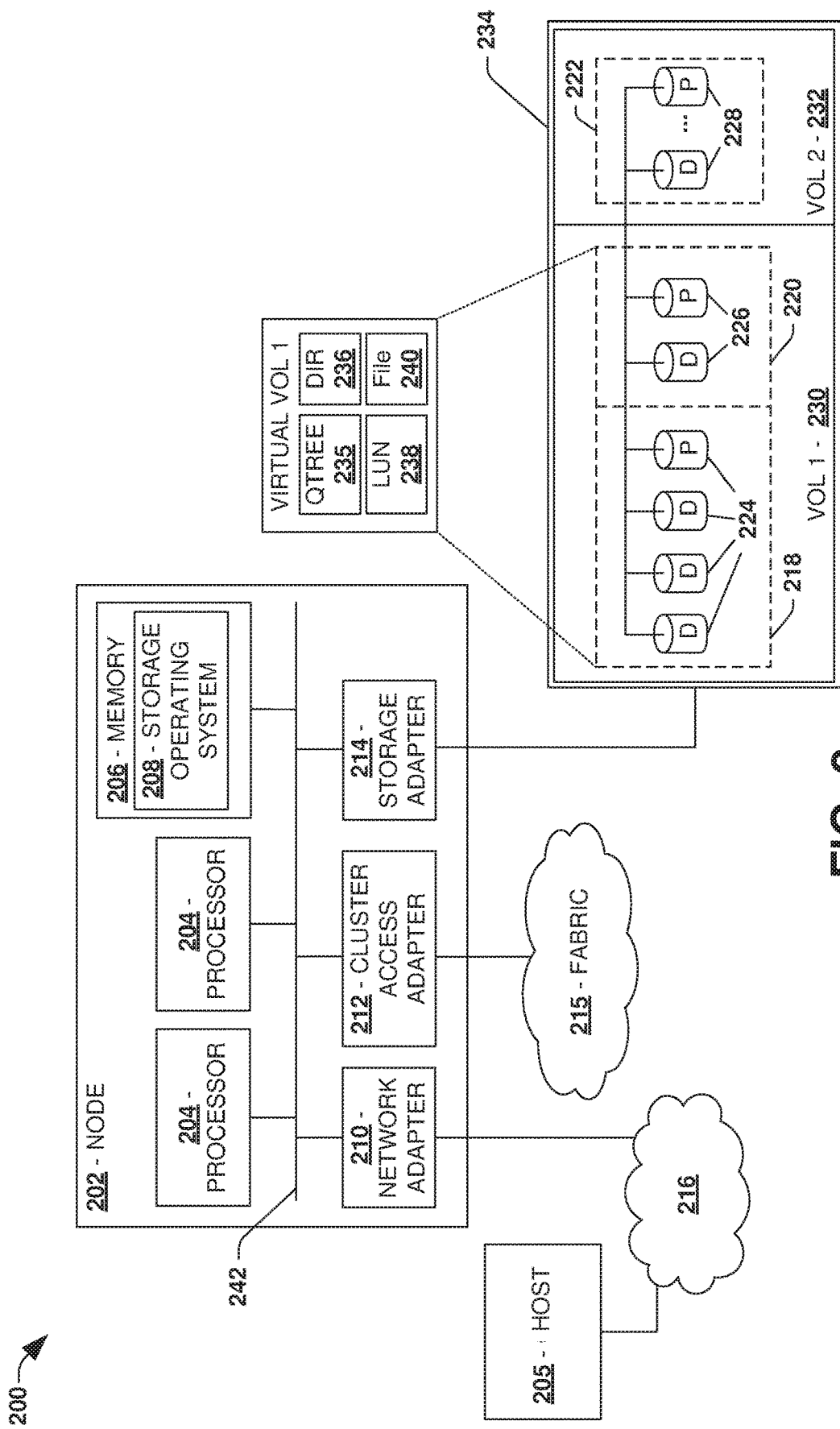
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP), a network file system (NFS) protocol, etc.). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that data synchronization may be implemented for the data storage system 200. In an example, storage operations, associated with data within the data storage devices 234 of the node 202, may be replicated to a second data storage device of a second node. For example, a catchup synchronization phase may use an in-flight log and/or a dirty region log (e.g., used to track storage operations received by the node 202 and/or regions within the data storage devices 234 modified by storage operations not yet replicated to the second data storage device) to asynchronously replicate data to the second data storage device. It may be appreciated that data synchronization may be implemented for and/or between any type of computing environment, and may be transferrable between physical devices (e.g., node 202, host 205, etc.) and/or a cloud computing environment (e.g., remote to the node 202 and/or the host 205).

Figure 3:
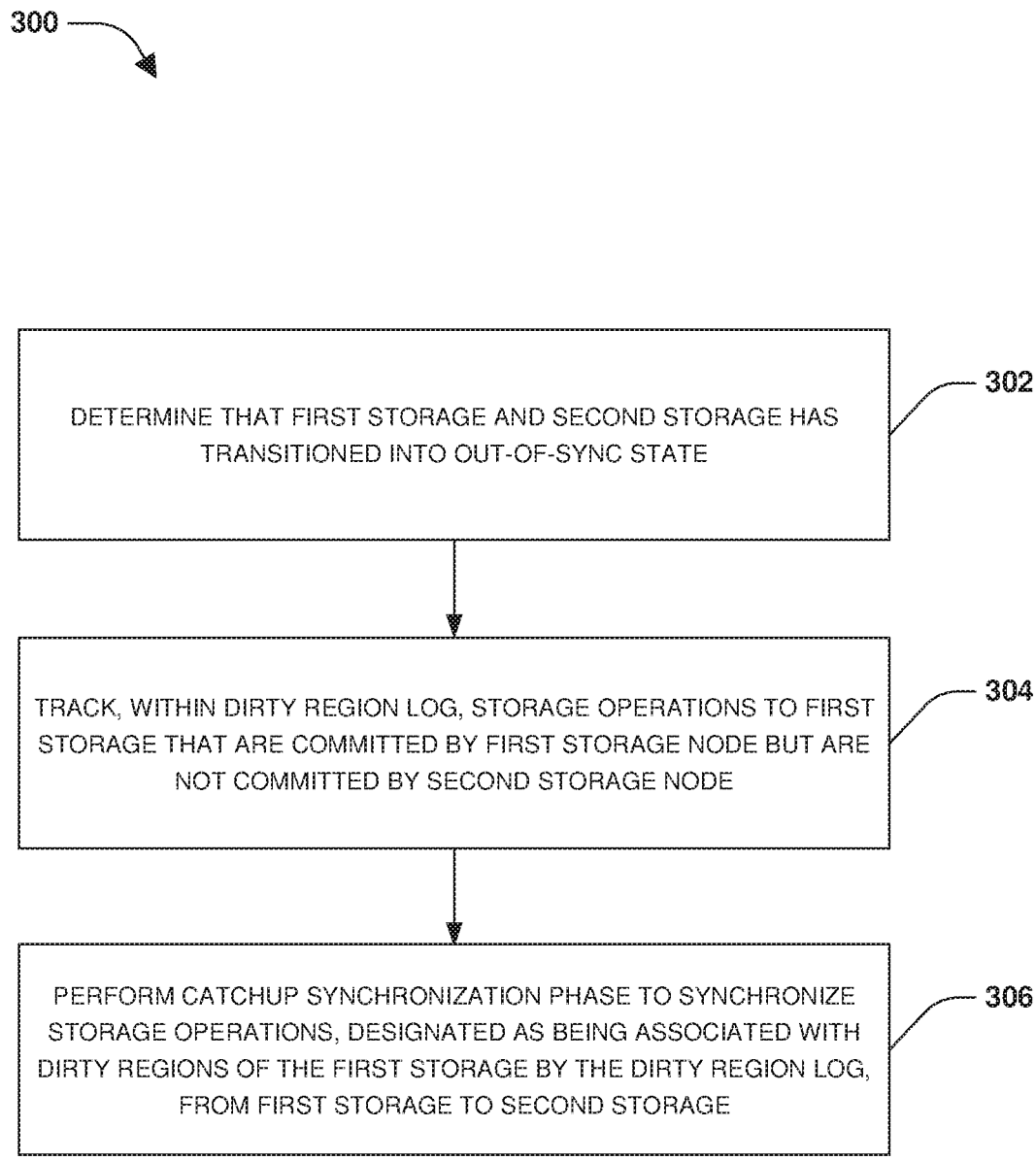
FIG. 3 is a flow chart illustrating an exemplary method of data synchronization.

One embodiment of data synchronization is illustrated by an exemplary method 300 of FIG. 3. A first storage node may be configured to provide clients with access to data stored within first storage. A second storage node may be configured to provide clients with access to data stored within second storage or other storage. The first storage node and the second storage node may be configured according to a disaster recovery relationship. For example, data from the first storage may be replicated to the second storage so that the second storage node may provide clients with failover access to replicated data within the second storage in the event the first storage node fails. While in a synchronous state, a storage operation, received by the first storage node from a client, may be synchronously stored within the first storage and replicated to the second storage before a storage operation complete response is provided back to the client (e.g., a storage operation may be split into two storage operations that may be committed to the first storage and the second storage in any order or in parallel). In an example, an in-flight log, used to track storage operations received by the first storage node but not yet committed to both the first storage and the second storage, may be maintained (e.g., a storage operation may be implemented to simultaneously write to the first storage and create an entry within the in-flight log). In an example, the in-flight log may be maintained as an in-core version (e.g., stored within memory), and may be persisted to an in-flight metadata file within a file system (e.g., persistent onto disk for surviving a failure).

However, synchronous replication may be impractical under certain situations, such as where the second storage node fails or reboots, communication from the first storage node to the second storage node is lost, a relatively high network latency, etc. At 302, the first storage of the first storage node and the second storage of the second storage node may be determined as having transitioned into an out-of-sync state (e.g., an inability to synchronously commit storage operations to the first storage and replicate to the second storage before responding back to clients within an acceptable time frame).

While in the out-of-sync state, a dirty region log may be used to track storage operations to the first storage that are committed by the first storage node but are not committed by the second storage node for replication (e.g., storage operations, received while communication to the second storage node is unavailable, that are committed by the first storage node and indicated as complete to clients notwithstanding not being replicated to the second storage), at 304. In an example, while in the out-of-sync state, if a size of a file grows beyond a threshold size, then a size of the file at a time of transitioning into the out-of-sync state may be captured so that subsequent changes beyond that size are not tracked and thus anything beyond that size is implicitly dirty. In an example, the dirty region log may be persisted to disk, such as to a private inode space of a volume or a metadata file of a file system of the first storage node. In an example, the dirty region log may be maintained as a bitmap comprising bitmap entries corresponding to regions within the first storage. When a storage operation is committed by the first storage node to modify a region, a bit of a corresponding bitmap entry may be modified (e.g., changed from a "1" to a "0" or from a "0" to a "1") to indicate that the region is now a dirty region that has been modified and thus is not consistent with a corresponding region within the second storage because the storage operation (e.g., the dirty region) has not yet been replicated to the second storage. In this way, the dirty region log may be evaluated to identify dirty regions, modified by storage operations, not yet replicated from the first storage to the second storage. In an example, various versions of the dirty region may be maintained as a set of dirty region logs. A current version of the dirty region log may be either rolled forward to a new version or rolled back to an older version.

At 306, a catchup synchronization phase (e.g., asynchronous replication of storage operations not yet committed to the second storage may be performed after communication to the second storage node becomes available; dirty regions within the first storage may be replicated to the second storage; etc.) may be performed to synchronize storage operations, designated as being associated with dirty regions of the first storage by the dirty region log, from the first storage to the second storage (e.g., replication of the dirty regions to corresponding regions within the second storage). In an example, the dirty region log and/or the in-flight log may be evaluated to determine whether to replicate a region of the first storage to the second storage. For example, catchup synchronization functionality (e.g., asynchronous replication) may be used to replicate a region based upon at least one of the dirty region log indicating that the region is dirty (e.g., has been modified by a storage operation that has not been replicated to the second storage) or the in-flight log indicating that a storage operation, associated with the region, has not been committed to both the first storage and the second storage. In an example, a resync scanner may be invoked to evaluate the dirty region log and/or the in-flight log to identify one or more regions within the first storage to replicate to the second storage using catchup synchronization functionality. Responsive to synchronizing a region, specified as dirty by a dirty region entry within the dirty region log, as committed to the second storage, the dirty region entry may be cleared.

During the catchup synchronization phase, new storage operations may be received and processed by the first storage node. If a new storage operation corresponds to a dirty region identified by the dirty region log, then the first storage operation may be committed to the dirty region within the first storage (e.g., and an operation complete response may be provided back to a client that issued the new storage operation) for subsequent synchronization by catchup synchronization functionality (e.g., asynchronous replication by the resync scanner). If the new storage operation corresponds to a non-dirty region within the first storage, then the new storage operation may be synchronously, such as in real-time, committed to the first storage and replicated to the second storage (e.g., and an operation complete response may be provided back to a client that issued the new storage operation and the new storage operation is committed to both the first storage and the second storage).

In an example, the dirty region log and/or the in-flight log may be used to reconcile snapshots. For example, a first snapshot of the first storage may be generated. A second snapshot of the second storage may be generated, such as while the storage nodes are in the out-of-sync state, and thus the second snapshot may be different than the first snapshot because one or more storage operations may have been committed to the first storage but not the second storage. In an example, storage operation processing may be facilitated during the generation of the first snapshot and/or the second snapshot (e.g., snapshots may be generated without draining storage operations, thus reducing latency increases otherwise caused by draining storage operations). The dirty region log and/or the in-flight log may be used to identify a snapshot difference between the first snapshot and the second snapshot. The second snapshot may be modified based upon the snapshot difference to create a reconciled snapshot having a data consistency with the first snapshot. In this way, the dirty region log and/or the in-flight log may be used to track data consistency between the first storage and the second storage for replication and/or snapshots.

Figure 4A:
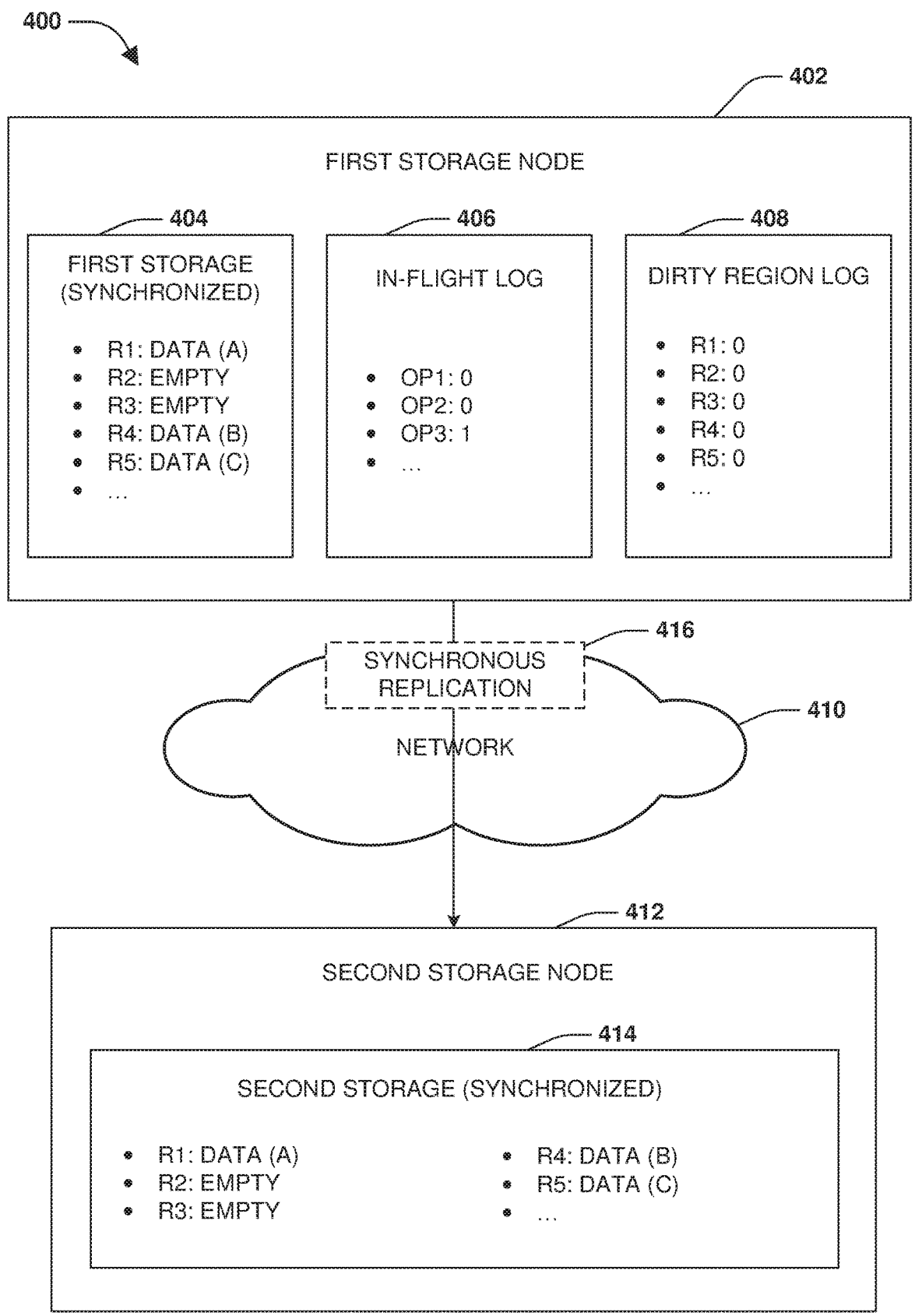
FIG. 4A is a component block diagram illustrating an exemplary computing device for data synchronization, where a first storage node and a second storage node are implementing synchronous replication.

FIGS. 4A-4I illustrate examples of a computing device comprising a system 400 for data synchronization. FIG. 4A illustrates a first storage node 402 configured to provide clients with access to data stored within first storage 404 (e.g., local storage locally attached to the first storage node 404, network storage communicatively coupled to the first storage node 404 over a network, etc.) and/or other storage not illustrated. A second storage node 412 is configured to provide clients to access to data stored within second storage 414 (e.g., provide clients with failover access to replicated data within the second storage 414) and/or other storage not illustrated (e.g., provide clients with primary access to data within third storage). In an example, the second storage 414 may be used to store replicated data that is replicated, such as synchronously replicated 416 over a network 410, from the first storage 404 to the second storage 414. For example, a first region comprising data (A), a second region that is empty, a third region that is empty, a fourth region comprising data (B), a fifth region comprising data (C), and/or other regions of the first storage 404 may be replicated to the second storage 414 as replicated regions. In this way, the first storage 404 and the second storage 414 may be in a synchronized state.

An in-flight log 406 may be maintained for the first storage node 402. The in-flight log 406 may track storage operations that are received by the first storage node 402, but are not yet committed by both the first storage node 402 to the first storage 404 and the second storage node 412 to the second storage 414. For example, a first storage operation and a second storage operation may have been received by the first storage node 402, and thus a first entry for the first storage operation and a second entry for the second storage operation may have been created in the in-flight log 406 to indicate that the first storage operation and the second storage operation have not yet been committed to both the first storage 404 and the second storage 414. Accordingly, once the first storage node 402 commits the first storage operation and the second storage operation to the first storage 404 and the synchronous replication 416 replicates the first storage operation and the second storage operation to the second storage node 412 that then commits the first storage operation and the second storage operation to the second storage 414, the first entry and the second entry may be modified (e.g., removed, zeroed out, etc.) to indicate that the storage operations have been synchronously committed to the first storage 404 and the second storage 414. Thus, the first storage node 402 may provide storage operation complete notifications to clients that sent the storage operations. In an example, a third storage operation may be received by the first storage node 402, and a third entry may be created (e.g., set to "1") within the in-flight log 406 to indicate that the third storage operation has not been committed to both the first storage 404 and the second storage 414.

Figure 4B:
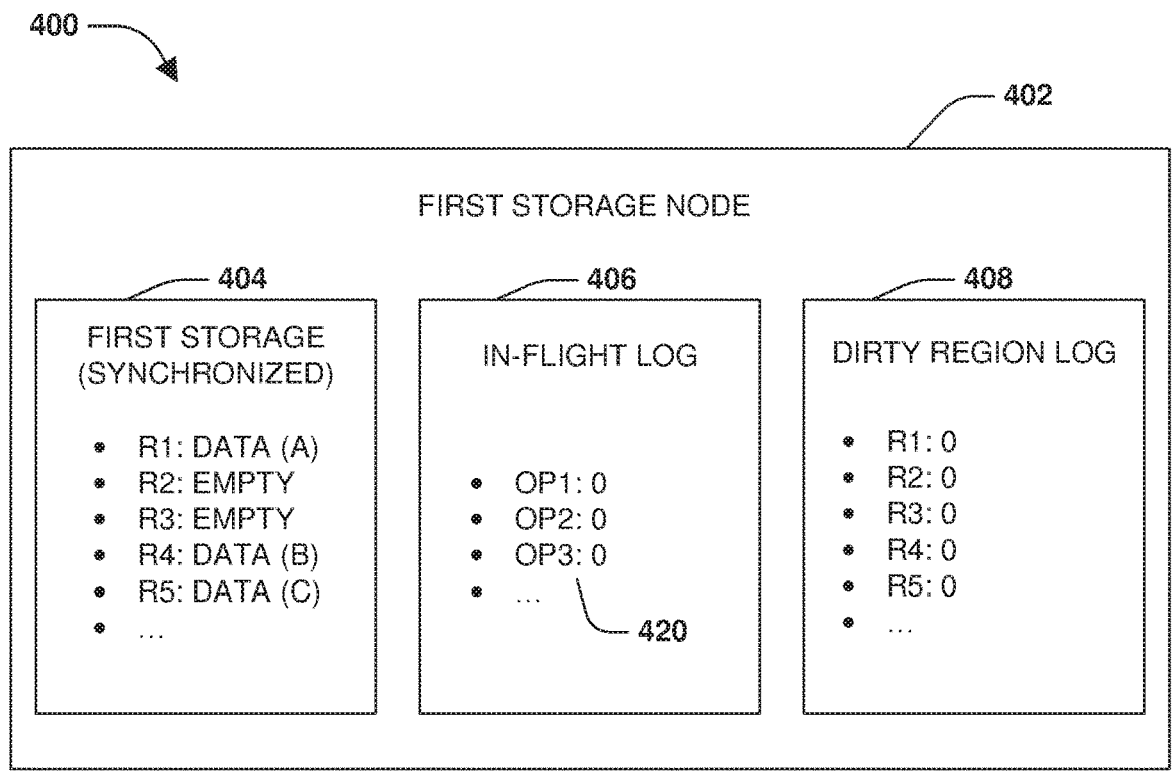
FIG. 4B is a component block diagram illustrating an exemplary computing device for data synchronization, where network communication between a first storage node and a second storage node is lost.
Figure 4B:
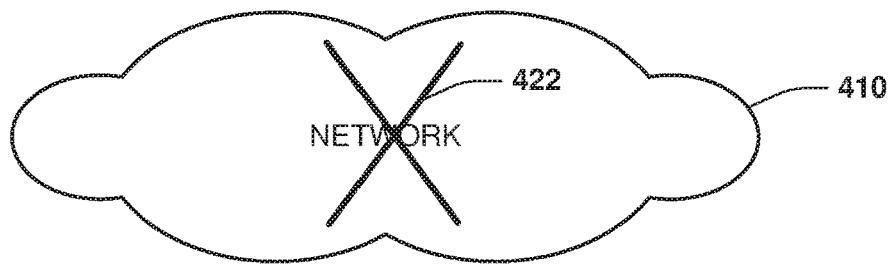
Figure 4B:
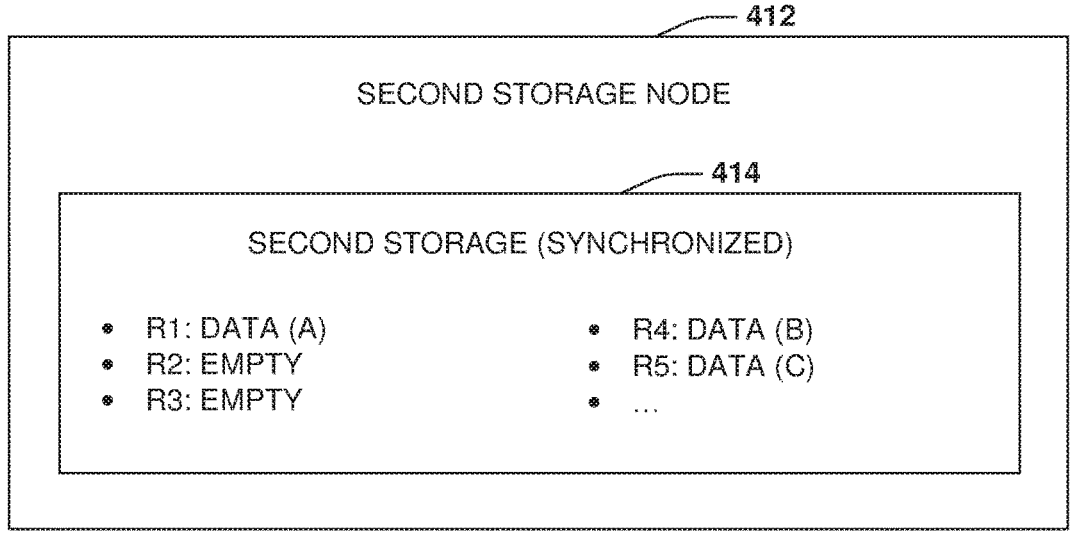

FIG. 4B illustrates the first storage node 402 and the second storage node 412 committing the third storage operation. Accordingly, the third entry within the in-flight log 406 may be modified (e.g., removed, zeroed out, etc.), thus indicating that the third storage operation has been synchronized between the first storage 404 and the second storage 414. Subsequently, a communication loss 422, over the network 410, between the first storage node 402 and the second storage node 412 may occur. Thus, the synchronous replication 416, over the network 410, may be lost and the first storage 404 and the second storage 414 may become out-of-sync due to the first storage node 402 processing storage operations that are unable to be adequately replicated to the second storage node 412 and second storage 414.

Figure 4C:
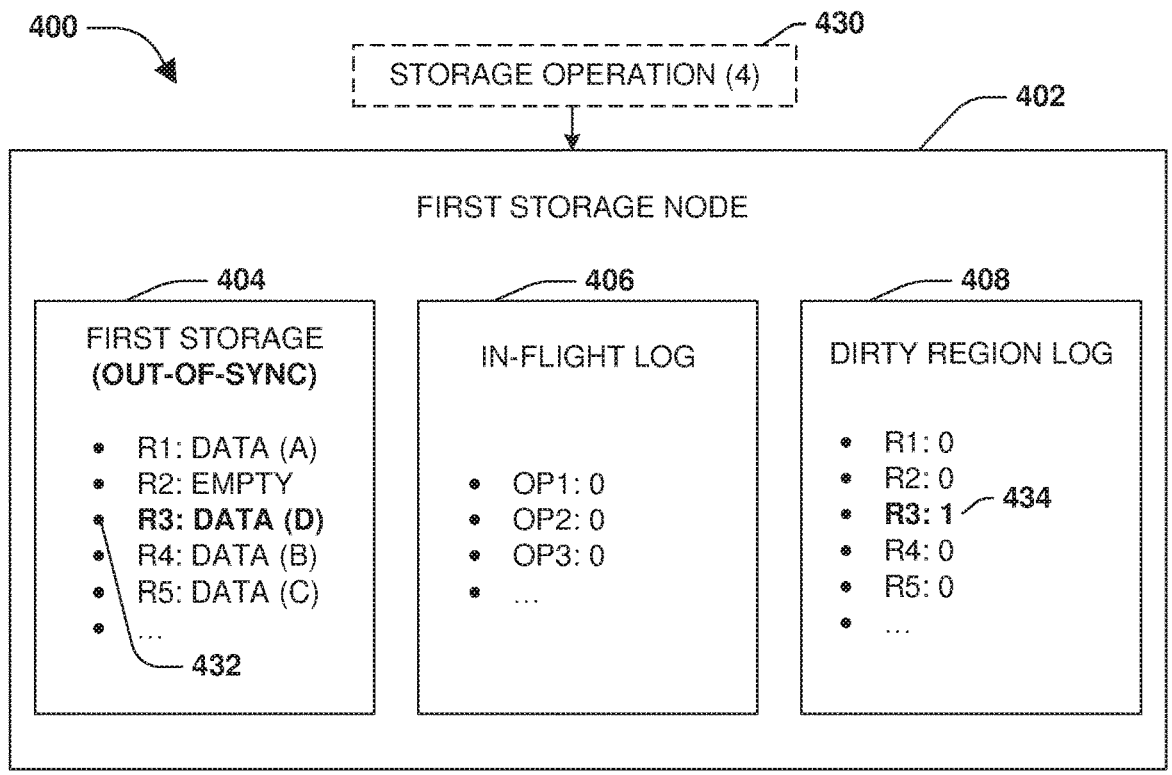
FIG. 4C is a component block diagram illustrating an exemplary computing device for data synchronization, where a first storage node processes a fourth storage operation while network communication is lost between the first storage node and a second storage node.
Figure 4C:
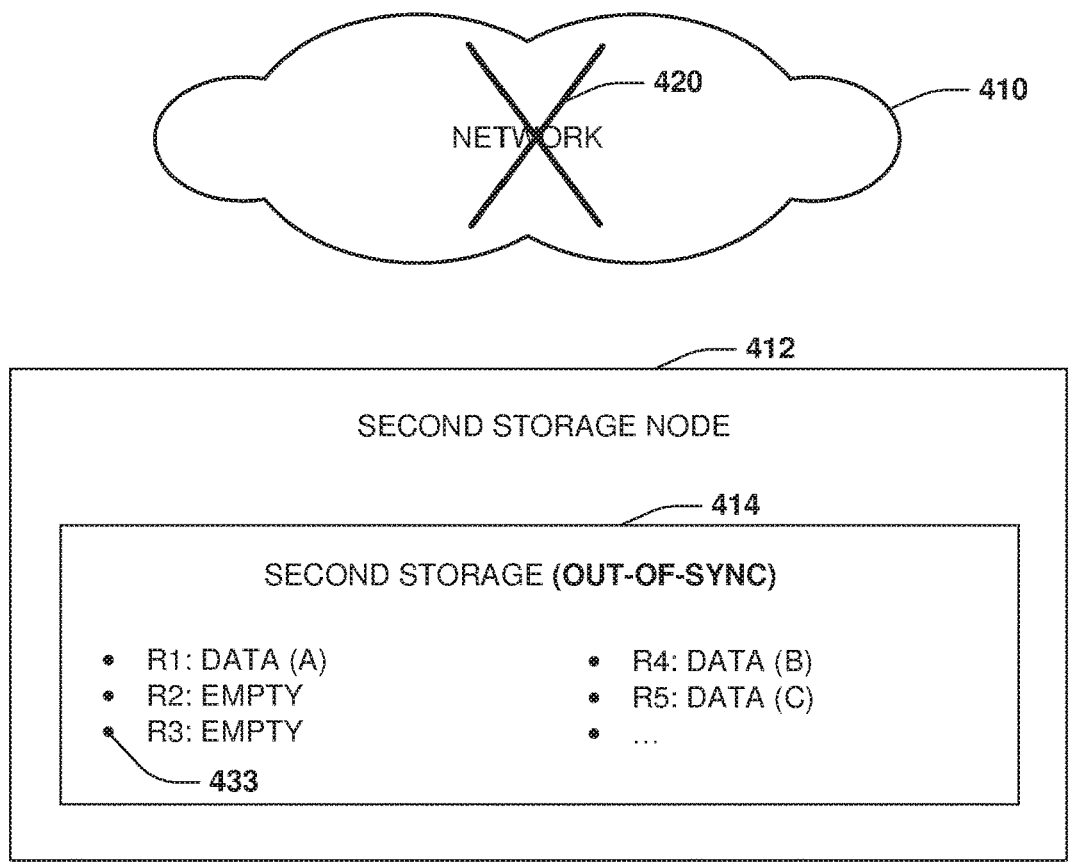

FIG. 4C illustrates the first storage node 402 and the second storage node 412 transitioning into an out-of-sync state, where the first storage 404 is out-of-sync with the second storage 414 (e.g., a loss of data consistency because storage operations may be processed and responded back to clients as complete by the first storage node 402 without synchronous replication to the second storage node 412). For example, a client may send a forth storage operation 430 to the first storage node 402 for writing data (D) into the third region 432 of the first storage 404. A fourth entry, not illustrated, may be created within the in-flight log 406 to indicate that the fourth storage operation 430 was received by the first storage node 402, but has not been committed to both the first storage 404 and the second storage 414. A bit, of a third dirty region entry 434, within the dirty region log 408, associated with the third region 432, may be set to indicate that the third region 432 of the first storage 404 has been modified (e.g., set to 1 to indicate that the third region 432 has been made dirty with the data (D) of the fourth storage operation 430). In this way, third dirty region entry 434 of the dirty region log 408 indicates that the third region 432 of the first storage 404 is out-of-sync and/or inconsistent with a corresponding third region 433 within the second storage 414.

Figure 4D:
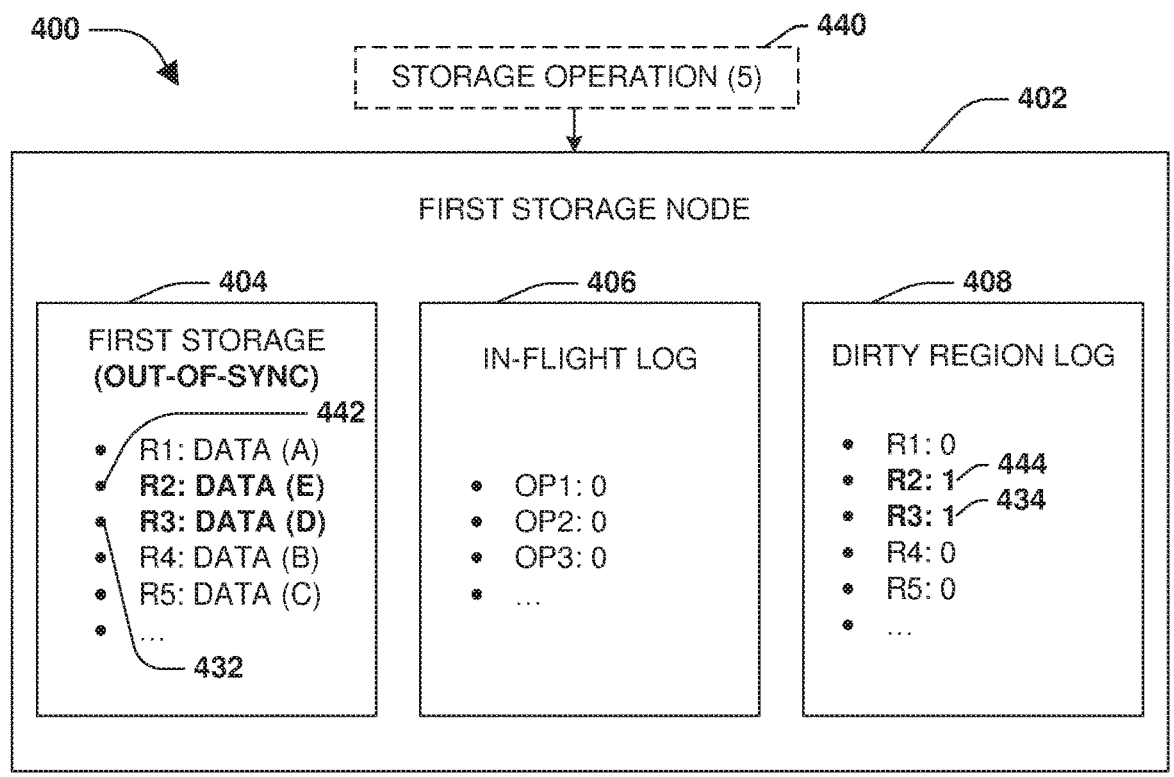
FIG. 4D is a component block diagram illustrating an exemplary computing device for data synchronization, where a first storage node processes a fifth storage operation while network communication is lost between the first storage node and a second storage node.
Figure 4D:
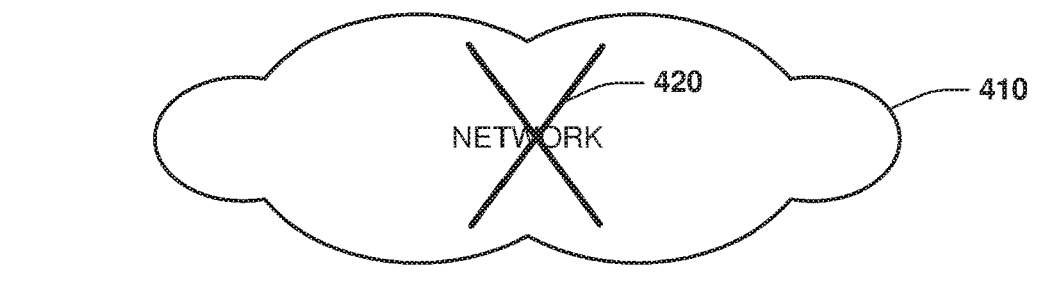
Figure 4D:
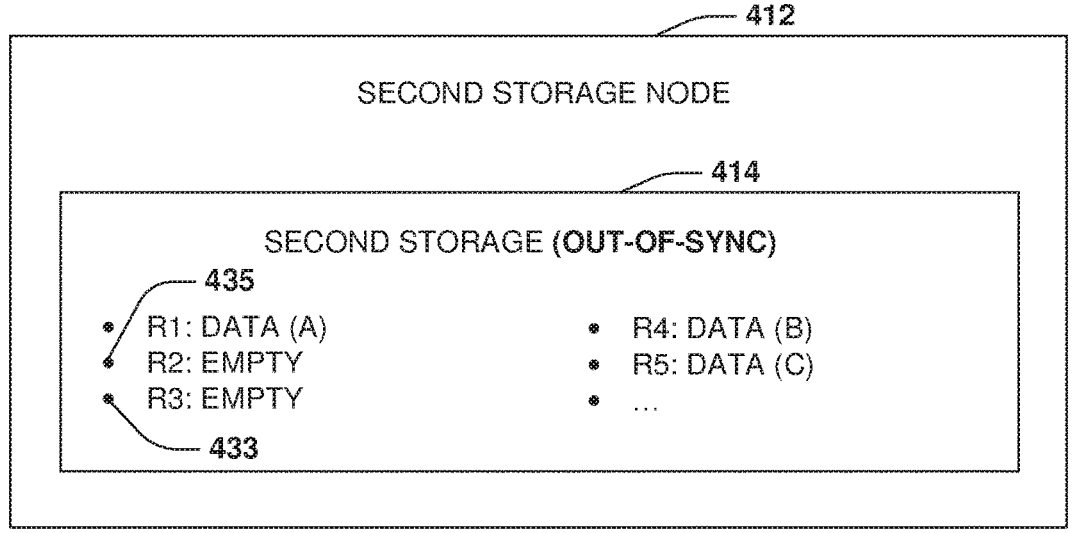

FIG. 4D illustrates the first storage node 402 and the second storage node 412 in the out-of-sync state. In an example, a second client may send a fifth storage operation 440 to the first storage node 402 for writing data (E) into the second region 442 of the first storage 404. A fifth entry, not illustrated, may be created within the in-flight log 406 to indicate that the fifth storage operation 440 was received by the first storage node 402, but has not been committed to both the first storage 404 and the second storage 414. A bit, of a second dirty region entry 444, of the dirty region log 408, associated with the second region 442, may be set to indicate that the second region 442 of the first storage 404 has been modified (e.g., set to 1 to indicate that the second region 442 has been made dirty with the data (E) of the fifth storage operation 440). In this way, second dirty region entry 444 of the dirty region log 408 indicates that the second region 442 of the first storage 404 is out-of-sync and/or inconsistent with a corresponding third region 435 within the second storage 414.

Figure 4E:
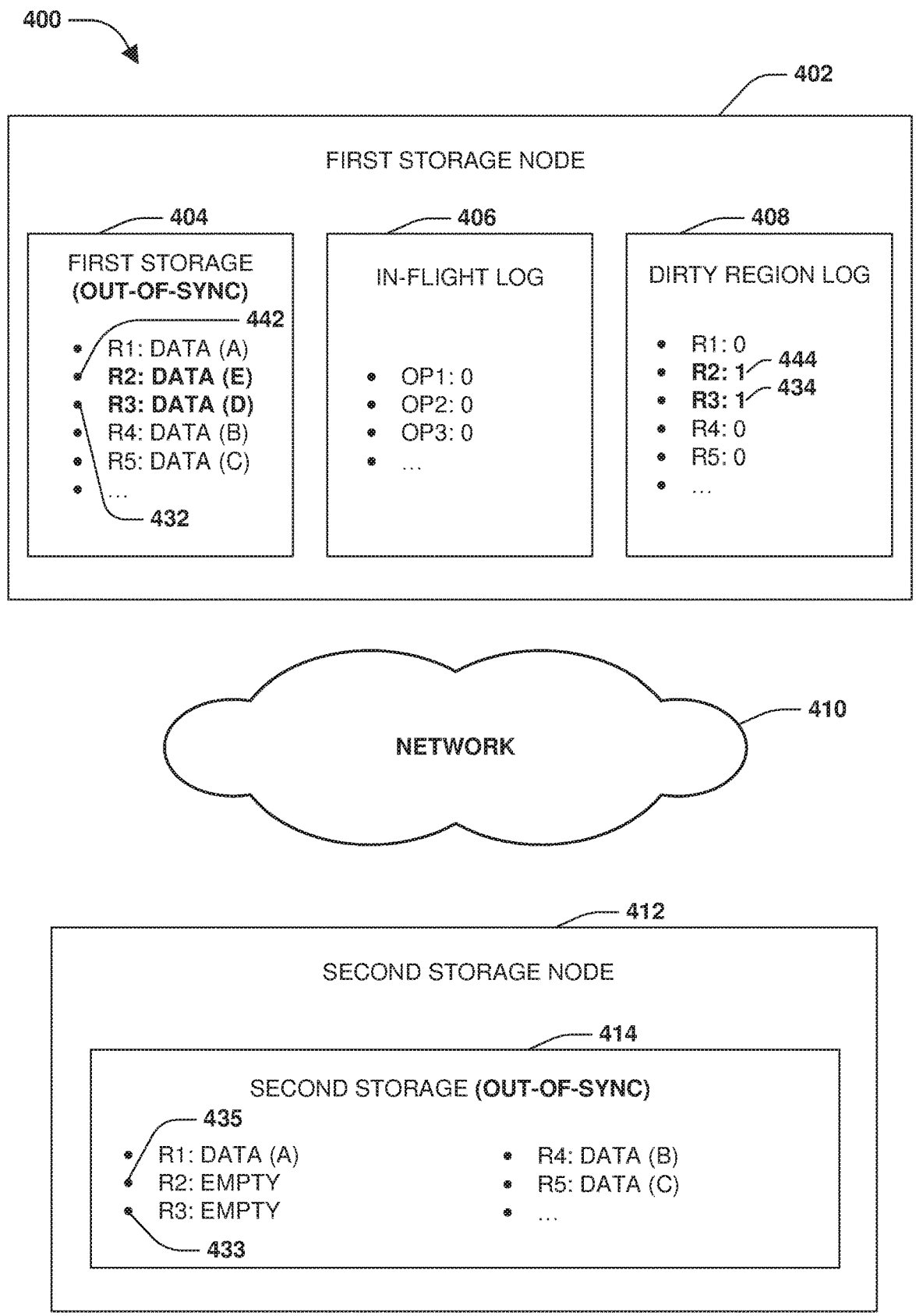
FIG. 4E is a component block diagram illustrating an exemplary computing device for data synchronization, where network communication between a first storage node and a second storage node is restored.
Figure 4F:
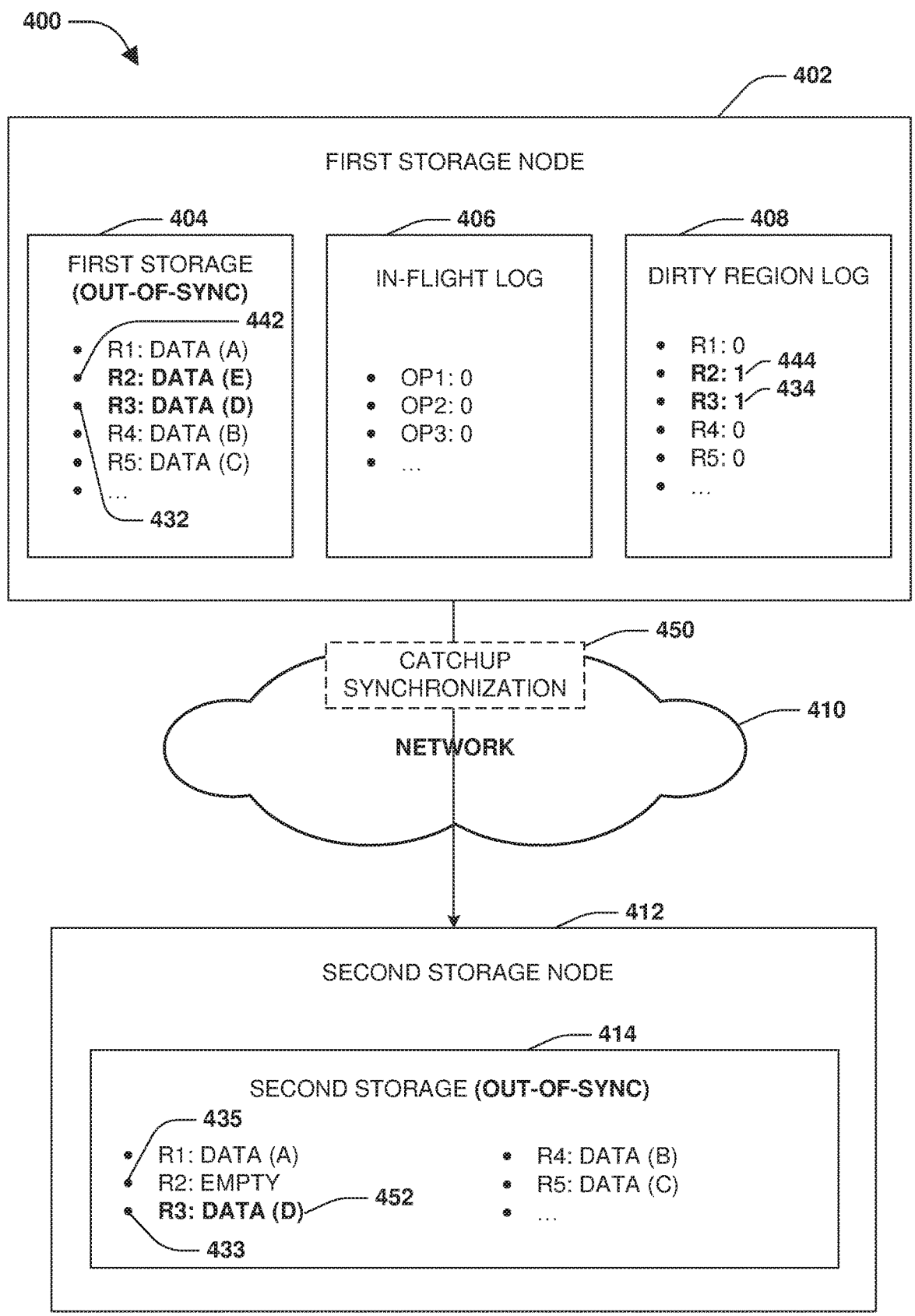
FIG. 4F is a component block diagram illustrating an exemplary computing device for data synchronization, where catchup synchronization is performed between a first storage node and a second storage node.

FIG. 4E illustrates communication being reestablished over the network 410 between the first storage node 402 and the second storage node 412. FIG. 4F illustrates the first storage node 402 and the first storage 404 being out-of-sync with the second storage node 412 and the second storage 414 after the communication has been reestablished, and thus a catchup synchronization phase may be performed, such as asynchronous replication by a resync scanner, to synchronize storage operations, such as the fourth storage operation 430 (e.g., replication of data (D) written to the third region 432 by the fourth storage operation 430) and the fifth storage operation 440 (e.g., replication of data (E) written to the second region 443 by the fifth storage operation 440), based upon the in-flight log 406 and/or the dirty region log 408. For example, catchup synchronization 450 of the data (D) within the third region 432 of the first storage 404 may be performed to asynchronously replicate the data (D), written by the fourth storage operation 430 to the third region 432, into the corresponding third region 433 within the second storage 414 of the second storage node 412 as replicated data (D) 452 based upon at least one of the in-flight log 406 indicating that the fourth storage operation 430 was received by the first storage node 402 and has not been committed to both the first storage 404 and the second storage 412 or the third dirty region entry 434 of the dirty region log 408 indicating that the third region 432 of the first storage 404 is out-of-sync and/or inconsistent with the corresponding third region 433 within the second storage 414. Once the third region 432 of the first storage 404 has been replicated to the second storage 414, the bit of the third dirty region entry 434 may be modified (e.g., removed, zeroed out, etc.) to indicate that the third region 432 is no longer dirty and thus is data consistent with the corresponding third region 433 of the second storage 414.

Figure 4G:
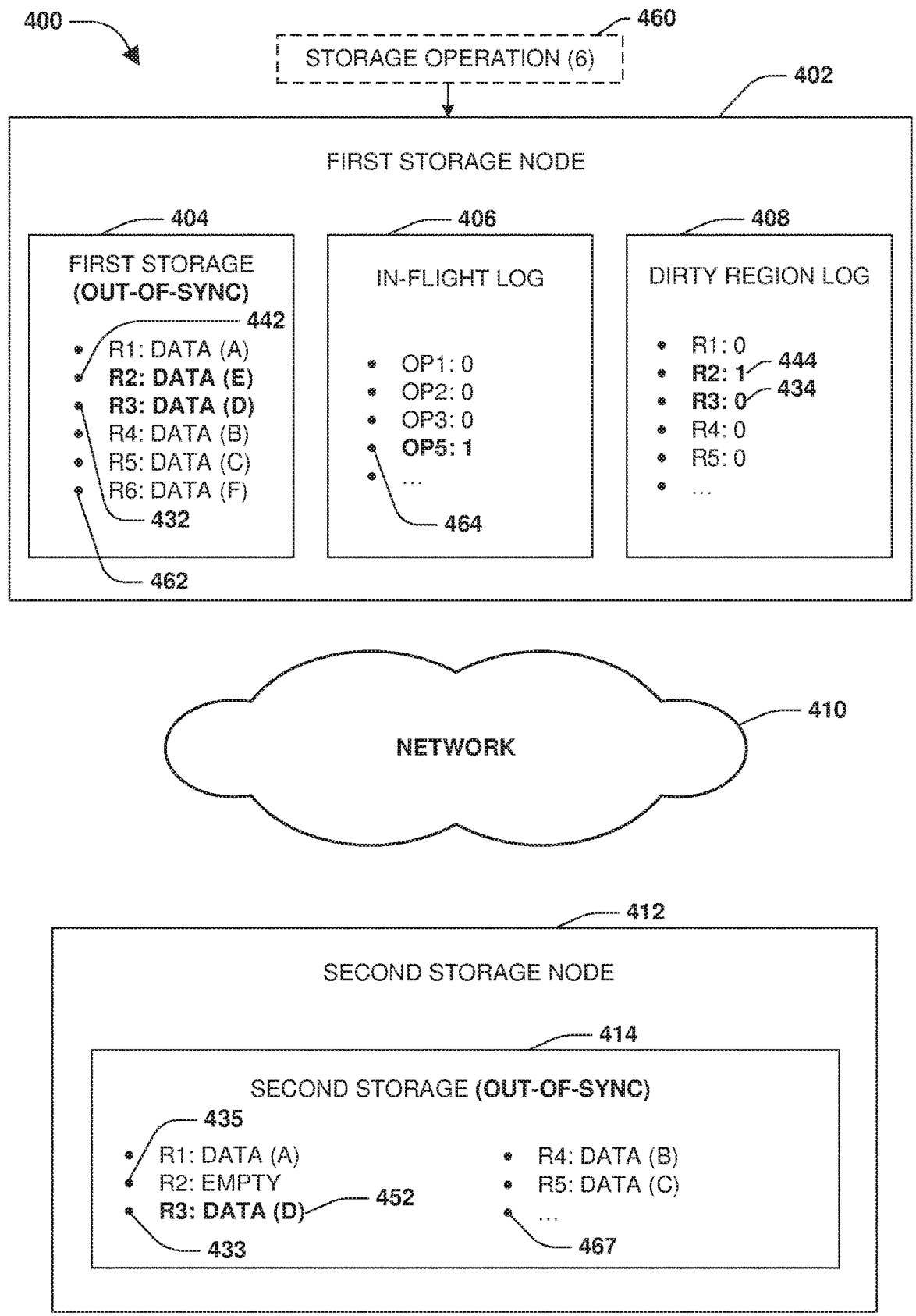
FIG. 4G is a component block diagram illustrating an exemplary computing device for data synchronization, where a sixth storage operation is synchronously committed to first storage and replicated to second storage while a first storage node and a second storage node are out-of-sync.
Figure 4H:
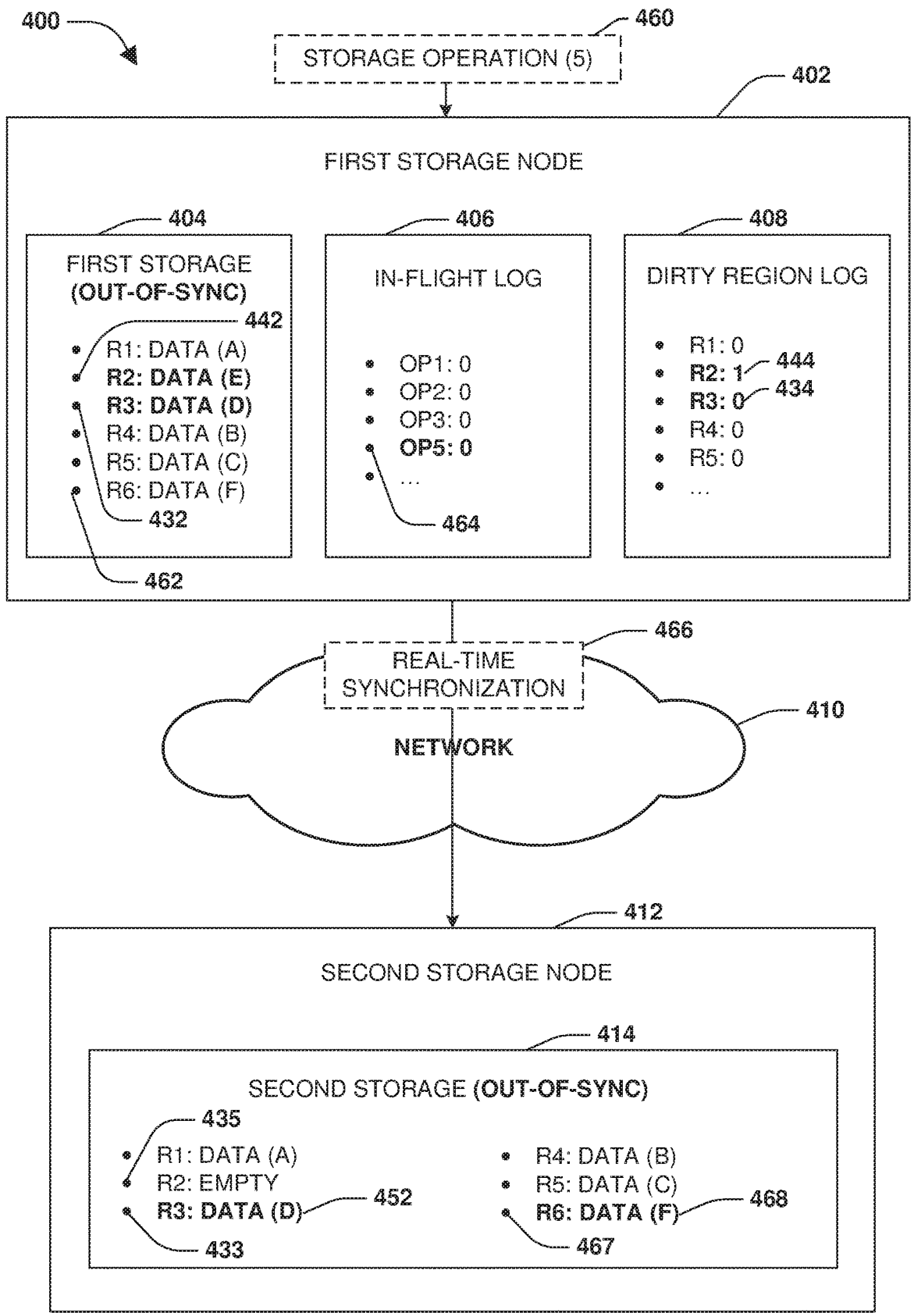
FIG. 4H is a component block diagram illustrating an exemplary computing device for data synchronization, where a sixth storage operation is synchronously committed to first storage and replicated to second storage while a first storage node and a second storage node are out-of-sync.

FIG. 4G illustrates the first storage node 402 receiving a sixth storage operation 460 from a third client. The sixth storage operation 460 may write data (F) into a sixth region 462 of the first storage 404. Because the dirty region log indicates that the sixth region 462 is a non-dirty region, the sixth storage operation 460 may be synchronously committed by the first storage node 402 to the first storage 404 by writing the data (F) into the sixth region 462 and replicating (e.g., real-time synchronization 466) to the second storage 414 such as into a corresponding sixth region 467 as replicated data (F) 468, as illustrated by FIG. 4H. In an example where a storage operation corresponds to a dirty region, such as the second region 442, the storage operation may be committed into the first storage 404 and may be later synchronized to the second storage 414 by a resync scanner because the second region 442 is already indicated as being dirty by the dirty region log 408.

Figure 4I:
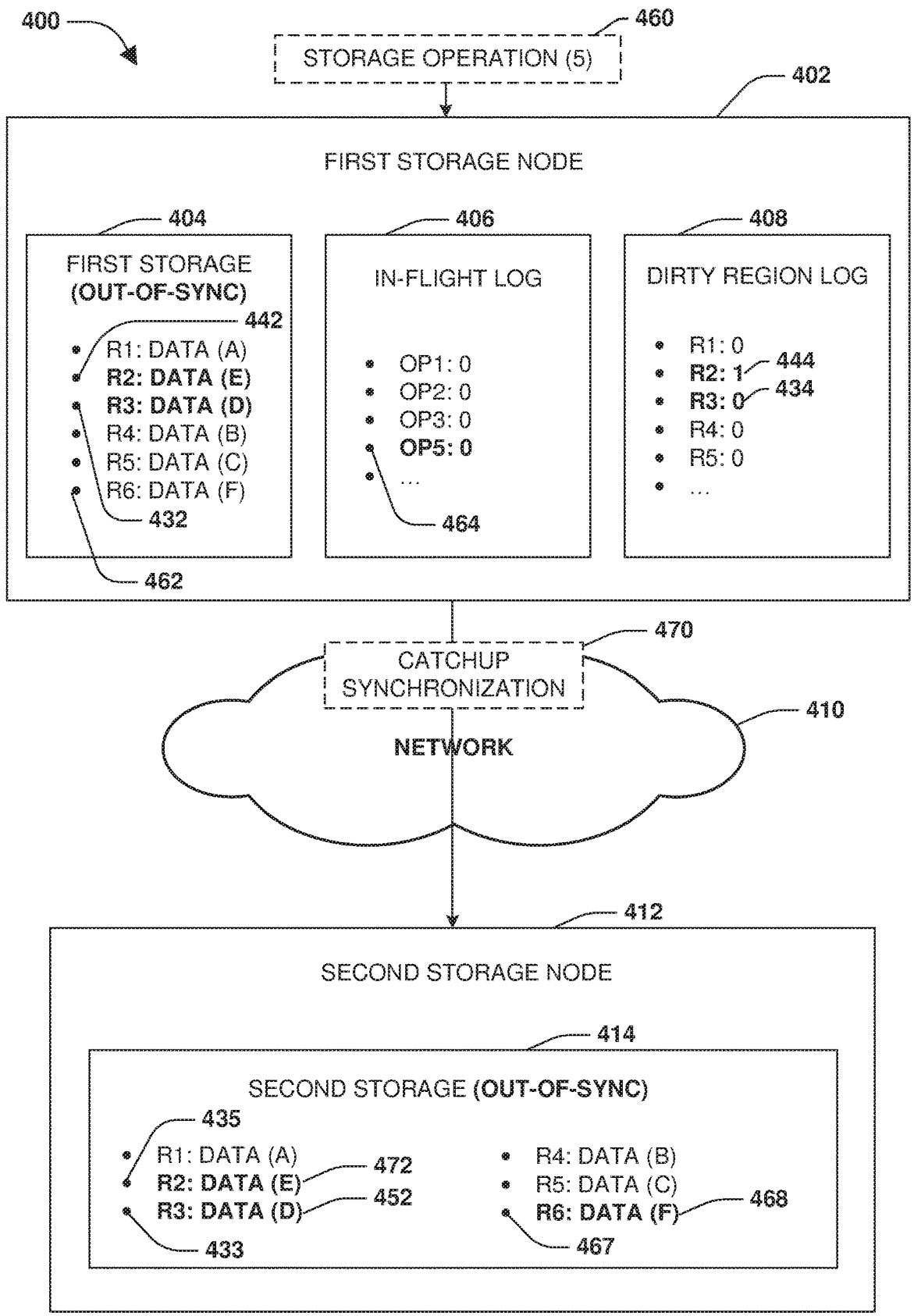
FIG. 4I is a component block diagram illustrating an exemplary computing device for data synchronization, where catchup synchronization is performed between a first storage node and a second storage node.

FIG. 4I illustrates catchup synchronization 470 of the data (E) within the second region 442 of the first storage 404 being performed to asynchronously replicate the data (E), written by the fifth storage operation 440 to the second region 442, into the corresponding second region 435 within the second storage 414 of the second storage node 412 as replicated data (E) 472 based upon at least one of the in-flight log 406 indicating that the fifth storage operation 440 was received by the first storage node 402 and has not been committed to both the first storage 404 and the second storage 412 or the second dirty region entry 444 of the dirty region log 408 indicating that the second region 442 of the first storage 404 is out-of-sync and/or inconsistent with the corresponding second region 435 within the second storage 414. Once the second region 442 of the first storage 404 has been replicated to the second storage 414, the bit of the second dirty region entry 444 may be modified (e.g., removed, zeroed out, etc.) to indicate that the second region 442 is no longer dirty and thus is data consistent with the corresponding second region 435 of the second storage 414.

Figure 5:
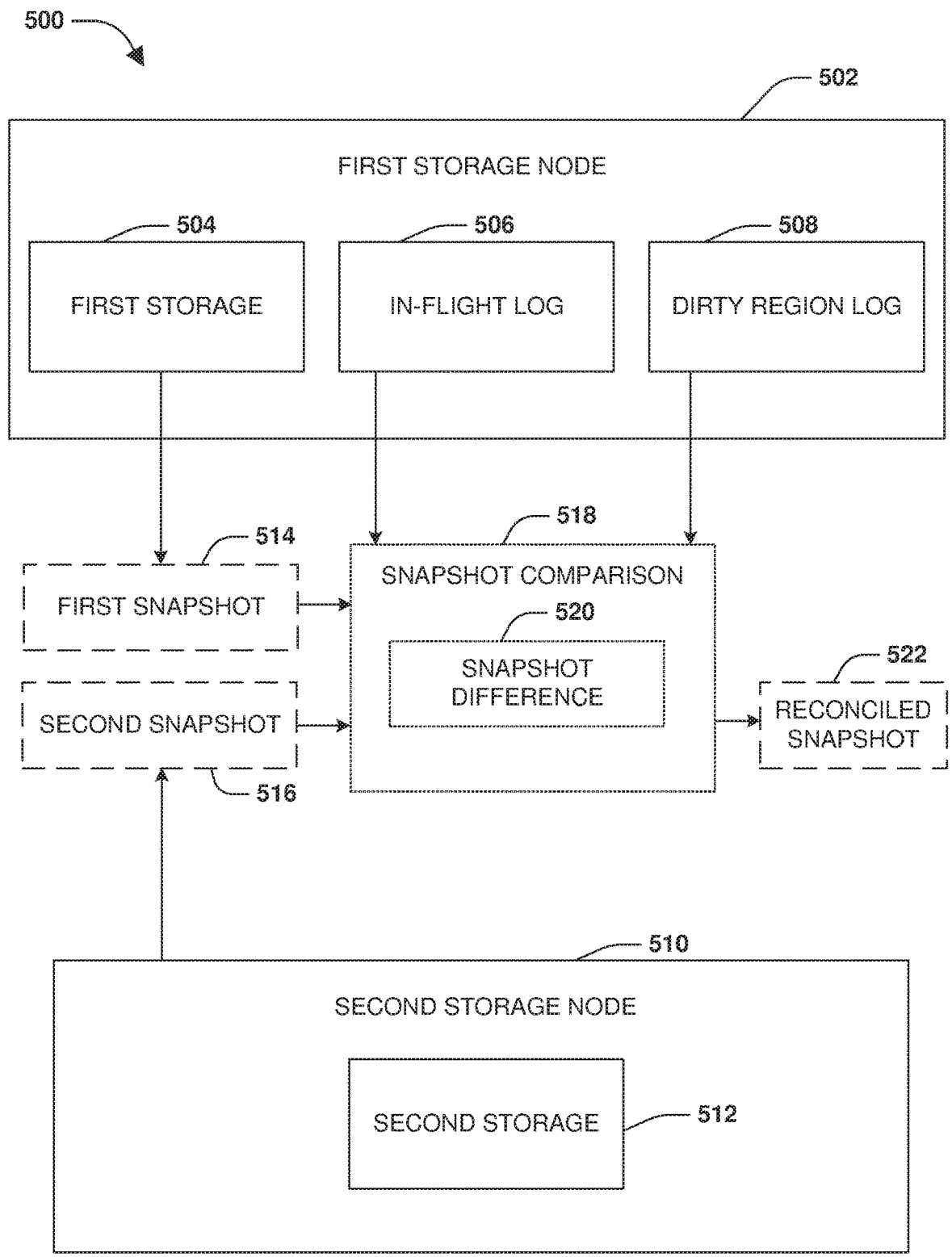
FIG. 5 is a component block diagram illustrating an exemplary computing device for maintaining data consistency between snapshots.

FIG. 5 illustrates an example of a system 500 for snapshot reconciliation. A first storage node 502 may be associated with first storage 504 that is out-of-sync with second storage 512 of a second storage node 510 having a disaster recovery relationship with the first storage node 502. An in-flight log 506 and/or a dirty region log 508 may be maintained for the first storage node 502 to indicate what storage operations have not been committed to both the first storage 504 and the second storage 512 and/or to indicate what regions within the first storage 504 are dirty because data within such regions have not been replicated to the second storage 512.

While the first storage 504 and the second storage 512 are out-of-sync, a first snapshot 514 of the first storage 504 and a second snapshot 516 of the second storage 512 may be generated. The in-flight log 506 and/or the dirty region log 508 may be used to compare 518 the first snapshot 514 and the second snapshot 516 to identify a snapshot difference 520 between the first snapshot 514 and the second snapshot 516. The snapshot difference 502 may correspond to data within the first storage 504 that is not data consistent with the second storage 512, such as due to storage operation that were committed to the first storage 504 but not yet replicated to the second storage 512 while the first storage node 502 and the second storage node 510 are in an out-of-sync state. Accordingly, the second snapshot 516 may be modified based upon the snapshot difference 520 to create a reconciled snapshot 522 that has data consistency with the first snapshot 514.

Figure 6:
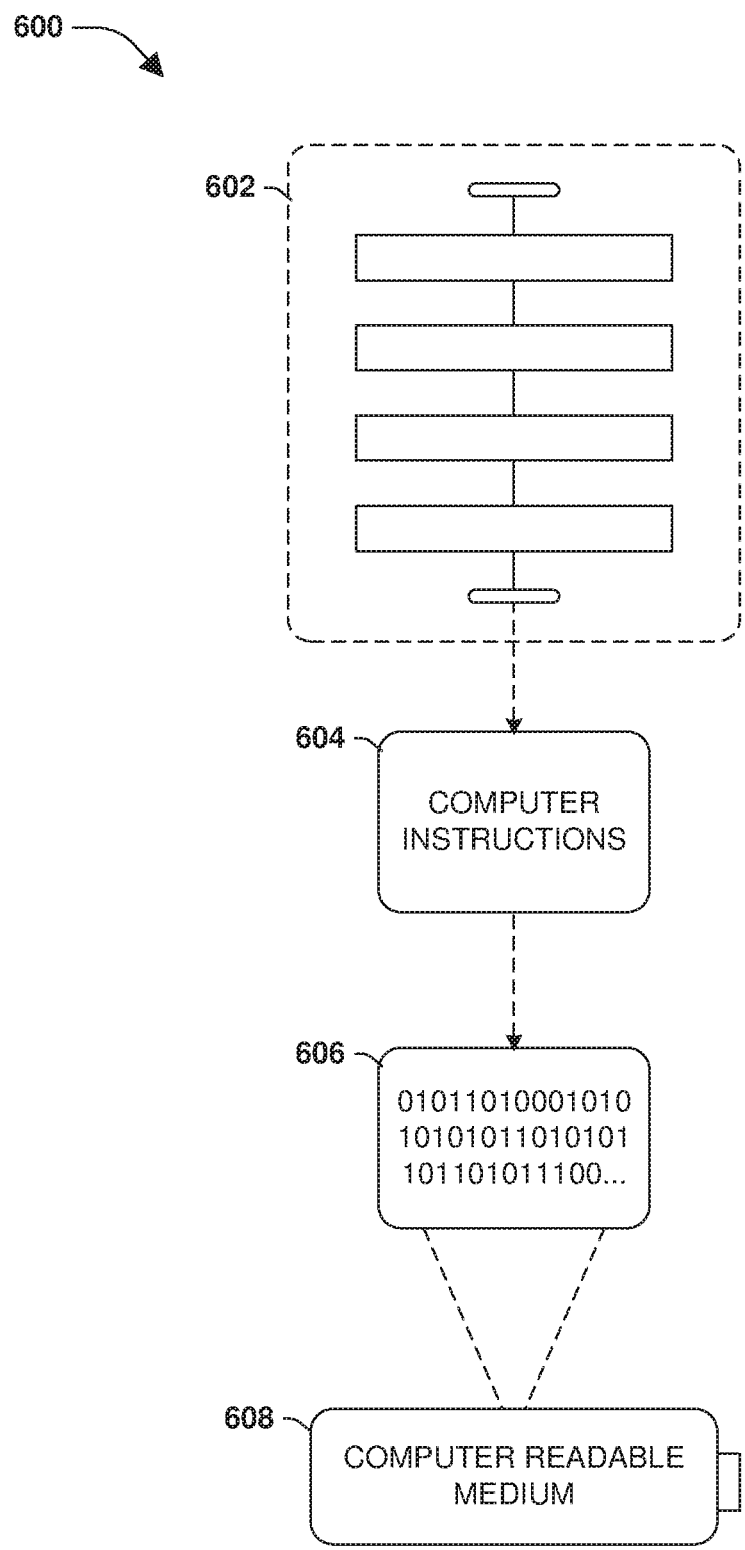
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 400 of FIGS. 4A-4I and/or at least some of the exemplary system 500 of FIG. 5, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A method comprising:
   generating a first snapshot of first storage and a second snapshot of second storage;
   tracking, within an in-flight log, pending write operations not yet committed to both the first and second storage, wherein an entry is created for a pending write operation in response to receiving the pending write operation from a client device, and is removed in response to the pending write operation being committed to both the first and second storage;
   maintaining a sync log, persisted to persistent storage, comprising a first bitmap corresponding to the in-flight log and a second bitmap corresponding to a dirty region log indicative of dirty regions of the first storage not yet replicated to the second storage;
   evaluating the first bitmap and the second bitmap to identify a snapshot difference between the first snapshot and the second snapshot based upon entries within the first bitmap corresponding to the in-flight log indicative of data differences due to the pending write operations not yet committed to both the first and second storage when the first and second snapshots were created, and based upon entries within the second bitmap corresponding to the dirty region log indicative of the dirty regions; and modifying the second snapshot using the snapshot difference to create a reconciled snapshot having data consistency with the first snapshot.

2. The method of claim 1, comprising:
in response to a first node committing a first storage operation and a second storage operation to the first storage and a second node committing a first replicated storage operation and a second replicated storage operation to the second storage, zeroing out a first entry for the first storage operation and a second entry for the second storage operation within the first bitmap of the sync log to indicate that the first storage operation and the second storage operation have been synchronously commit to the first storage and the second storage.

3. The method of claim 1, comprising:
in response to the first node committing a third storage operation to a region of the first storage, setting a third entry within the second bitmap of the sync log to a non-zero value to indicate that the region is out-of-sync with the second storage; and
in response a catchup synchronization performed by a resync scanner replicating data in the region to the second storage, zeroing out the third entry.

4. The method of claim 1, comprising:
in response to a first node committing a first storage operation and a second storage operation to the first storage and a second node not yet committing a first replicated storage operation and a second replicated storage operation to the second storage, setting values of a first entry for the first storage operation and a second entry for the second storage operation within the first bitmap of the sync log to a non-zero value.

5. The method of claim 1, wherein the in-flight log is evaluated to identify the data differences as data within the first storage that is not data consistent with the second storage due to one or more pending write operations being committed to the first storage but not yet replicated to the second storage while the first storage and the second storage are out-of-sync.

6. The method of claim 1, comprising:
utilizing the dirty region log to track dirty data within the first storage not yet replicated to the second storage.

7. The method of claim 1, wherein the snapshot difference corresponds to changes made to the first storage but not the second storage while the first storage and the second storage are out-of-sync.

8. A non-transitory machine readable medium having stored thereon machine executable code, which when executed by a machine, causes the machine to:
generate a first snapshot of first storage and a second snapshot of second storage;
track, within an in-flight log, pending write operations not yet committed to both the first and second storage, wherein an entry is created for a pending write operation in response to receiving the pending write operation from a client device, and is removed in response to the pending write operation being committed to both the first and second storage;
maintain a sync log, persisted to persistent storage, comprising a first bitmap corresponding to the in-flight log and a second bitmap corresponding to a dirty region log indicative of dirty regions of the first storage not yet replicated to the second storage;
evaluate the first bitmap and the second bitmap to identify a snapshot difference between the first snapshot and the second snapshot based upon entries within the first bitmap corresponding to the in-flight log indicative of data differences due to the pending write operations not yet committed to both the first and second storage when the first and second snapshots were created, and based upon entries within the second bitmap corresponding to the dirty region log indicative of the dirty regions; and
modify the second snapshot using the snapshot difference to create a reconciled snapshot having data consistency with the first snapshot.

9. The non-transitory machine readable medium of claim 8, wherein the first snapshot and the second snapshot are generated when the first storage and the second storage are out-of-sync.

10. The non-transitory machine readable medium of claim 8, wherein the machine executable code causes the machine to:
process storage operations directed to the first storage during the generation of the first snapshot.

11. The non-transitory machine readable medium of claim 8, wherein the machine executable code causes the machine to:
process storage operations directed to the second storage during the generation of the second snapshot.

12. The non-transitory machine readable medium of claim 8, wherein the in-flight log is evaluated to identify the data differences as data within the first storage that is not data consistent with the second storage due to one or more pending write operations being committed to the first storage but not yet replicated to the second storage while the first storage and the second storage are out-of-sync.

13. The non-transitory machine readable medium of claim 8, wherein the machine executable code causes the machine to:
utilize the dirty region log to track dirty data within the first storage not yet replicated to the second storage.

14. The non-transitory machine readable medium of claim 8, wherein the snapshot difference corresponds to changes made to the first storage but not the second storage while the first storage and the second storage are out-of-sync.

15. A computing device comprising:
a memory comprising machine executable code for performing a method; and
a processor coupled to the memory, the processor configured to execute the machine executable code to cause the processor to:
generate a first snapshot of first storage and a second snapshot of second storage;
track, within an in-flight log, pending write operations not yet committed to both the first and second storage, wherein an entry is created for a pending write operation in response to receiving the pending write operation from a client device, and is removed in response to the pending write operation being committed to both the first and second storage;
maintain a sync log, persisted to persistent storage, comprising a first bitmap corresponding to the in-flight log and a second bitmap corresponding to a dirty region log indicative of dirty regions of the first storage not yet replicated to the second storage;
evaluate the first bitmap and the second bitmap to identify a snapshot difference between the first snapshot and the second snapshot based upon entries within the first bitmap corresponding to the in-flight log indicative of data differences due to the pending write operations not yet committed to both the first and second storage when the first and second snapshots were created, and based upon entries within the second bitmap corresponding to the dirty region log indicative of the dirty regions; and modify the second snapshot using the snapshot difference to create a reconciled snapshot having data consistency with the first snapshot.

16. The computing device of claim 15, wherein the first snapshot and the second snapshot are generated when the first storage and the second storage are out-of-sync.

17. The computing device of claim 15, wherein the machine executable code causes the processor to:

process storage operations directed to the first storage and the second storage during the generation of the first snapshot.

18. The computing device of claim 15, wherein the machine executable code causes the processor to:

process storage operations directed to the first storage and the second storage during the generation of the second snapshot.

19. The computing device of claim 15, wherein the in-flight log is evaluated to identify the data differences as data within the first storage that is not data consistent with the second storage due to one or more pending write operations being committed to the first storage but not yet replicated to the second storage while the first storage and the second storage are out-of-sync.

20. The computing device of claim 15, wherein the machine executable code causes the processor to:

utilize the dirty region log to track dirty data within the first storage not yet replicated to the second storage.

* * * * *